United States Patent [19]

DePuy

[11] 3,894,559
[45] July 15, 1975

[54] MANIFOLD VALVE

[76] Inventor: Leland Q. DePuy, 7792 Grendier Ln., Brecksville, Ohio 44141

[22] Filed: Mar. 28, 1974

[21] Appl. No.: 455,867

[52] U.S. Cl. ............ 137/595; 137/625.47; 251/315
[51] Int. Cl. ............................................ F16k 11/02
[58] Field of Search .......... 137/595, 625.15, 625.16, 137/625.46, 625.47; 251/315, 317

[56] References Cited
UNITED STATES PATENTS
3,450,157   6/1969   Hewson ............................. 137/595

Primary Examiner—Henry T. Klinksiek
Attorney, Agent, or Firm—P. D. Golrick

[57] ABSTRACT

A manifold body block has a longitudinal blind main bore receiving through its open end an assembly of two ball valve members spaced on a sealed stem projecting through a gland in a plug threaded in the open end to accept an operating handle; two transverse parallel flow passages through the block perpendicular to and counterbored past the main bore accepting alternatingly, relative to the ball assembly insertion, dropped-in seal and seat and seal sets providing diametric, Teflon-ring seats for each ball; four through-holes parallel to the flow passages and clear of the main bore for bolting the block directly on a flange of an instrumentation or process line device with the valve passage inlet or outlet ends aligned and sealed to respective flange pressure ports of the device; pressure tubing connecting plugs threaded into the counterbore open ends retaining the second-inserted seats; both balls having aligned respective first slots angularly spaced about the rotational axis from a diametric main flow passage therein; and one ball having a second slot 180° from the first slot thereof; so that one setting connects pressure inlets of a differential pressure instrument to respective pressure taps, a second setting blocks the taps from the instrument inlets, and a third setting intermediate the first two connects one process line pressure tap to both instrument inlets for zero checking or calibration, or as a source of purging fluid.

In many industrial or research environments where differential pressure sensing or reading instruments are used, for example, connected to two pressure tap points on opposite sides of an orifice plate or of a Venturi section installation in a process line for flow measurement, it is desirable that the connections be made through pressure piping and valving arrangements whereby the instrument selectively may receive pressure from both taps for normal instrument function; may be cut off from both taps for instrument maintenance or during non-operating periods for the process equipment; and for differential pressure zero check or calibration may have both pressure inputs to the instrument connected to each other so that actual zero pressure differential is sensed, usually with one process line pressure tap connected to both instrument inputs.

The differential pressure instrument to which the process line pressure or pressures is applied may be a direct reading instrument such as a manometer, or a differential pressure cell producing an output signal corresponding to difference in pressures observed, the output signal being applied as the input to either local or remote indicator or recorder instrumentation registering either the pressure differential or a variable (such as a flow rate) which is a function of the pressure differential; or the output being at times applies to a process variable controlling device.

14 Claims, 5 Drawing Figures

3,894,559

MANIFOLD VALVE

The present invention will be described as utilized in conjunction with an orifice plate or venturi section used in a process line for flow measurement purposes, the process line pressure taps of which are then connected to a differential pressure sensing cell.

Generally for such applications it is highly desirable that the described pressure piping and valving arrangement be compact; simple for the functions attained; low in costs of initial fabrication, installation, and also maintenance; hence rugged and durable; quickly and easily operated either manually or by some power device, especially for relatively frequent periodic zero differential pressure checking or calibration.

For this reason and purpose various multi-valve assemblies or "manifold valve" units have been proposed and commercially available on the market, some intended to be attached or mounted directly to a differential pressure instrument, such as the differential pressure cell, there including in one body or at least a compact assembly plural valve members for making or cutting off selectively the various desired or desirable connections between the process line pressure taps and the instrument. These prior devices have incorporated various types of valving members, such as plug, globe, or ball valve type members; the ball valve type having the advantage of lower maintenance requirements, usually with provision as well for replaceable requirements, usually with provision as well for replaceable valve seals or seats.

Valving arrangements or units of the prior art for this purpose have had one or more of various disadvantages, such as bulkiness, hence occupying an undesirably large space at the point of installation; low service life or requiring more frequent maintenance than would be desirable; in manifold valve units, also complexity of the passageways to be machined or otherwise provided in a body of the valve unit; relatively complex valve seat or sealing structures; the need of separate actuation or manipulation of the plural valve members; and consequent high fabrication, installation and/or maintenance costs.

By the present invention there is provided a manifold valve unit having a single actuation or operating element, rotatable manually or by an actuator through relatively short angular throw to selected positions for the several functions of connecting the process line pressure taps to the instrument; of blocking process line pressure taps from the instrument; of connecting the two pressure input points of the instrument to each other and to the high pressure side of the process line for zero pressure differential calibration or check of the instrument; and if desired after more extensive calibration or testing periodically of the instrument by a fluid different from that of the process line, then affording opportunity for purging with process line fluid both the manifold valve and the pressure passages to and within the instrument, when the latter are appropriately vented.

Furthermore a simple compact durable valve unit structure is afforded, hence achieving low cost in fabrication, installation and in maintenance, by providing a manifold body block having a longitudinal blind main bore, intersected by parallel and axially spaced traverse passage bores extending through a narrow dimension of the block, perpendicular to corresponding opposed parallel block faces, the transverse passages appropriately counterbored first to receive from one side pairs of relatively simple annular valve seal or seat elements for dual ball valving members, which as a single subassembly on a stem are inserted endwise into the main bore with the stem sealed to and projecting from a plug screwed into the open bore end to accommodate either a manual setting, handle, knob or an actuator connection; the plug having an appropriate packing gland for the stem; the open ends of the counter-bores then including simple connector fittings at least for connecting tubing to the process line taps and serving further at least a valve seat retaining function. The manifold body block has further appropriate transverse bores clearing the aforedescribed bores and passages, and simple known face seals about the valve outlets, whereby the unit is quickly secured to an instrument input flange or face.

In this arrangement the ball valve elements or spheres have each the typical diametric passage; here these passages being mutually oriented so that the inlet and outlet ports of the valve at one stem setting or angular position are simultaneously put in communication; by a stem turn substantially greater than a quarter turn are blocked and further, at about 90° position from the ball main diametric passage, have aligned respective slots, whereby the outlet ports or passages of the valve, hence the pressure inlets of the instrument, may be put into communication with the main bore space and thereby with each other; at another stem position one of the ball valve elements, preferably that intended for control of the high pressure tap, having a second slot located diametrically to the first, so that the process line high pressure side tap is put in communication with the body main bore at the same time that the outlet ports of the valve are put into communication with each other. Moreover at a third stem or valve setting, useful for calibration, the ports are all blocked from each other and the bore space; and in a change between the first and third settings (process and calibration modes), necessarily the valving member or stem transits the second position (zero mode) to ensure equalization of pressures on two sides of the instrument, especially to avoid damage to the instrument upon return to process mode by "bumping" due to residual unequal pressures inadvertently left there after calibration. This arrangement, hereinafter described with respect to a particular embodiment of the invention, provides structural and fabrication simplicity, both in the block, the valve members and stem subassembly, and in the seats therefor.

The general object then of the present invention is to provide a simple and improved manifold valve unit. Another object is to provide a manifold valve for the stated purposes which is compact for the obtained functions and readily mounted to environmental structure at the place of use.

A futher object is to provide a manifold type valve, for the described purposes, including plural valve members simultaneously operable at, and by manipulation of, a single valve stem.

A further object is the provision of a manifold type instrument valve which substantially eliminates possibility of instrument damage or destruction of calibration due to inadvertent failure to relieve calibration-engendered residual pressure differences therein.

Other objects and advantages will appear from the following description and the drawings, wherein.

Figure 1:
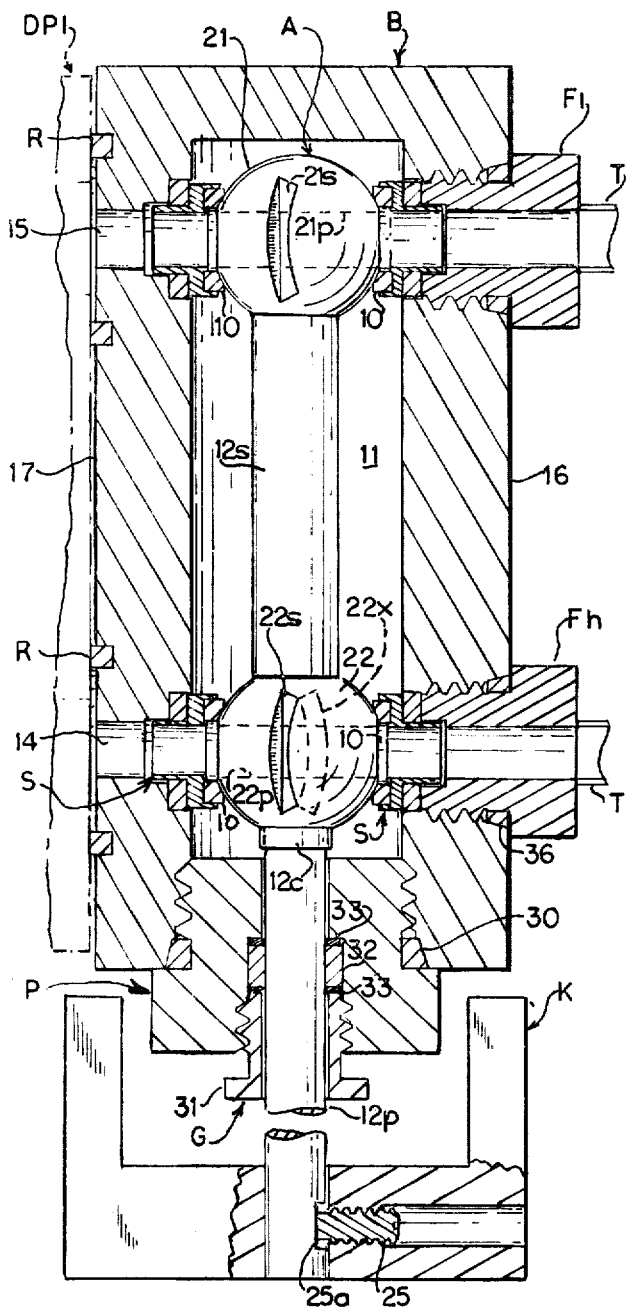
FIG. 1 is a central longitudinal section of an assembled manifold valve, taken as indicated by the lines 1—1 in FIGS. 2 and 3.
Figure 2:
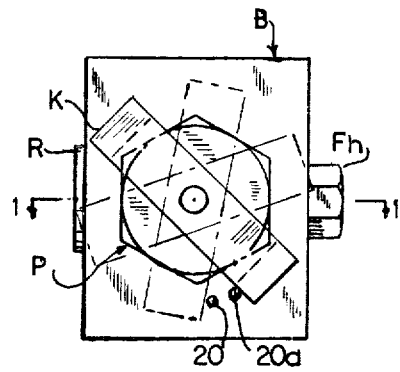
FIG. 2 is an elevation of the operating end of the valve unit.

As shown clearly by FIG. 1, in the drawings of one embodiment of the invention, the manifold valve unit is comprised of a rectangular block body B; a composite valve member, a stem and dual ball valve member assembly A, received through the open end coaxially into a main longitudinal blind bore 11, closed at the insertion end by a headed, threaded-in sealing plug P provided with a packing gland G to seal the projecting stem portion 12p carrying a rectangularly U-shaped handle or knob K set-screw-secured thereon; and identical seat and seal assemblies S including self-lubricating tough elastomeric (e.g., Teflon) annular seats 10, received and located as diametric pairs with respect to each valve member in counterbores of transverse high and low pressure flow passages 14, 15. These passages extend perpendicular to the longitudinal bore axis and to those opposed block faces bounding a narrower block dimension to provide valve inlet and outlet connection points, and at the main bore, corresponding bore port mouth regions valved by respective balls. In FIG. 1 handle K and the stem end portion are represented rotationally displaced from a position corresponding to the actual setting of the valve member relative to the ports.

For valve input connections by tubing T to high and low pressure process taps, generally conventional fittings Fh, Fl, are threaded in from one block face 16 into and sealed to the respective counterbore mouths; and mounting face seal rings R, each received in a respective circular groove in the opposite or mounting face 17 concentric with the respective transverse passage axes, hence with the valve outlet openings, are provided for sealing to the two pressure inlet apertures of the inlet flange DPI of an instrument component device, such as a differential pressure cell. However, where the valve is to be mounted also on a flange having pressure tap outlet apertures, seal rings may similarly be provided about the inlet connection ends of passages 14, 15 with simple bored plugs or threaded sleeves used at the fitting locations. When the valve is to have tubing connections both to the instrument and to the process line device, there the pressure outlet apertures at face 17 are also threaded for appropriate tubing connector fittings. Or when the valve is to be flange-mounted on the process line device with tubing connections to instrumentation, the valve orientation, as to connections, may simply be reversed, with 180° shift of the stem relative to the operating handle.

Of course, the handle K and the adjacent block end face may be provided with appropriate index marks and legends, to indicate the appropriate settings for the valve; and also extreme position stops are provided by way of a pair of stop screws 20, 20a threaded endwise in the block to project into the accurate path of the legs of the handle.

In the dual ball valve stem assembly, two like-dimensioned balls or spheres 21, 22 are welded or brazed to opposite ends of a stem spacer portion 12s with their diametric main valving passages 21p, 22p parallel to each other and perpendicular to the stem axis; at a location angularly offset from the main passages, the balls having similarly oriented, therefore aligned, ancillary passage slots 21s, 22s of substantially square-bottomed cross section, the respective longitudinal center planes of these slots extending parallel to the stem axis and slightly to one side thereof.

The ball 22, adjacent the projecting stem end and controlling the high pressure line tap, has a further similar slots 22x more or less diametrically located to 22s with its center plane falling on the opposite side of the axis from and parallel to that of 22s. Thus all slots are in constant communication with the free space of the main bore, and therefore with each other.

Figure 5:
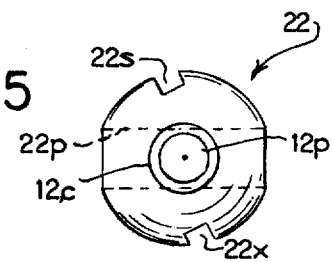
FIG. 5 is an end view of the valving member subassembly shown in FIG. 1.

It may be noted from FIG. 5 that the slots are oblique to the spherical surface, and that slots 22s and 22x actually are disposed with two-fold rotational symmetry relative to the stem axis; and that the shorter side of the slots 22s and 22x, (hence also 21s), that is, the higher extreme point of the intersection of the shorter wall side with the sphere surface, occurs at an about 90° location from the diametric axis of the main passage, so that the major part of the open face of the slot in each case thus occurs at a location respectively nearer to one than to the other of the diametric main valving passage in the ball.

The longer walls of the two slots or grooves 22s, 22x lie in a common diametric plane of the sphere, thus in an axial plane of the stem; the axis of the main passages in the balls being perpendicular to the stem axis. The longer walls of the grooves may aptly be located at 70° angular spacing from the axis of the main passage through each ball.

The stem may be adapted to receive the handle set screw 25 from either of two 180° spaced positions, by duplicating or carrying the aperture 25a through the stem diameter, for the previously described reversibility of the inlet-outlet orientation.

The diameter of the body block main bore 11 is somewhat greater than that of the balls, and the open end is female-threaded to receive the plug P, which is sealed to the body by the elastomeric O-ring or seal ring 30, received in and compressed under the plug head into sealed relation in a sloped-walled shallow counterbore or rabbet.

For tool engagement, the plug P and so also the follower 31 threaded therein may be round headed with holes in face or circumference or hex-headed. The follower inner end is reduced to the recess beneath the threaded counterbore of the plug P for compressing against the recess the sleeve 32 of appropriate packing sandwiched between metal washers 33 in a conventional arrangement.

On the inner end of the projecting stem portion 12p, preferably turned from solid stock, a cylindrical enlargement 12c is recessed conformably to the surface of the sphere, as are the ends of 12s, the latter being preferably tubular.

Thus the sub-assembly A is readily fabricated as a weldment by jigging two solid spheres with the spacer stem portion 12s therebetween and the projecting stem portion 12p in alignment with 12s and against sphere 22, and then spot welding the spheres to the respective abutting stem end portions by three equally spaced spot welds on each stem-to-sphere abutting region. Thereafter main passages 21p, 22p may be diametrically bored through the spheres, the slots 21s, 22s, 22x machined, as well as a set screw engaging hole 25a for the handle K, with any desirable grinding to symmetry or other purposes being then carried out to ensure proper alignment and axial or angular dispositions.

Each identical seat and seal assembly S comprises a ball-engaging and sealing Teflon ring of rectangular cross-section as the seat 10, seated in one coaxially recessed face of a round end enlargement or head of a tubular carrier 10c, and a second Teflon seal ring of rectangular cross-section 10s received about the carrier tubular body 10b and against the shoulder formed by the head for sealing the assembly to the body. The recessed head face provides surfaces coaxial to the carrier bore axis and closely embracing circumferentially the bottom, external and internal surfaces of the ring 10; exteriorly, for the major part, interiorly for the minor part, of the ring axial length for good sealing. The diameter of the head is slightly smaller than the body bores receiving the rings 10s. In the assembled valve, the seat ring elements 10 of the assemblies S project into the main bore 11 to engage the respective ball valve members in a sealing relation at diametrically opposed locations.

The port mouth engagement of the seat rings 10 in assemblies S diametrically with the balls presents low frictional engagement to stem turning, and is not subject to damage even by the edges of the ball slots where the seat rings are made of a Teflon plastic. The sealing arrangement on the balls as such effectively provides the necessary axial positioning of the stem assembly. Also the inner face of the end plug P also serves as a stop for stem enlargement 12c to provide further restraint on the stem assembly from outward displacement by handle-applied force.

Figure 3:
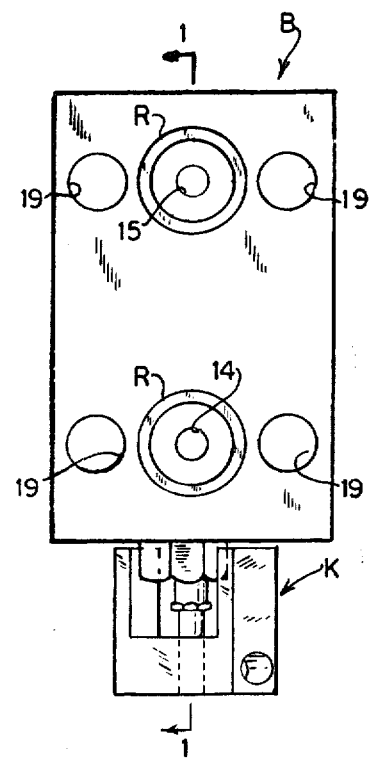
FIG. 3 is a side elevational view of the unit, taken as indicated by the view lines 3—3 in FIG. 1.
Figure 4:
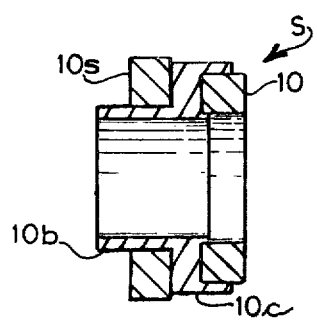
FIG. 4 is a detail section of a seal and seat assembly.

Considering the body block B in detail, the main bore 11 is parallel to and slightly to one side of the longitudinal center line of the block. As shown more clearly in FIG. 3, the block has a plurality, here four, of transverse bolt holes 19 disposed as vertical pairs on opposite sides of the main bore, or in horizontal pairs about the respective transverse passages.

The transverse passages 14, 15 representing the main valve passages and ports, and respective inlet and outlet connection points, served by respective ball members, are made by boring through the narrower block dimension on centerlines perpendicular to the faces 16, 17 and to the main bore axis, and then successively deep counterboring to result in a twice-reduced diameter on the far side of the passage just before the outlet side face 17; thus resulting in a larger counterbore continued in from face 16 to a point a short distance past the main bore. This forms a supporting shoulder 35 for the respective seat assembly S, beyond which the second counterbore provides endwise and radial clearance for the end of the carrier tubular body portion allowing compression of the respective seal ring 10s against the confining cylindrical and radial surfaces of the carrier and of the ring-receiving counterbore.

The outer ends of passages 14, 15 from face 16 are female-threaded up to the main bore to receive respective throughbored, plug-type like fittings Fh and Fl. Each of the latter has its inner end counterbored to accept with endwise and slight circumferential clearance the end of the carrier tubular body portion 10b of a respective assembly S, and has a flat end face adapted to sealingly engage the respective seal ring 10s for compressing the latter in sealing relation with the confining surface of the carrier. Each fitting itself is sealed to the body by an appropriate seal ring 36 confined compressed beneath the fitting head about a preferably unthreaded periphery of the fitting and in a sloped walled counterbore or rabbet in the block.

For this body structure it is seen that the set up and machining operations are few and easily carried out to produce the bores, the concentric grooves for seals on the instrument side face, and other necessary associated machined structures, details and formations.

With this arrangement, before the valve member A, the stem and valve ball assembly, is inserted, the stop screws 20, 20a are threaded into appropriate apertures provided on the handle-adjacent face of the block; the two seat assemblies S on the instrument side of the bore are inserted into position from the larger ends of the transverse bores, followed by insertion of the assembly A with the plug P and follower G thereon, and the seal 30 in place; the plug is started into the bore; the second pair of seat assemblies are inserted into position; and the connection fittings with seals 36 thereon are screwed into place. The plug P is screwed the rest of the way into position and the handle K is secured on the stem by its screw 25 to complete the basic unit assembly. The annular seal rings R in the face grooves are usually applied at the time of installation.

For convenience in the assembly procedure just described, the rings 10 and 10s preferably have a light interference fit on the carrier 10c for retention in handling as a unit. The form of the seal assemblies S provides a certain degree of self-alignment for appropriate sealing to the balls and to fixed surfaces with which the rings 10 and 10s engage. Furthermore, the axial dimensioning of the ports and body surfaces perpendicular thereto are such that with the fitting heads screwed down onto the body face 16 and with the balls 21, 22 resiliently engaged between the rings 10 at diametric locations, the valve number assembly is disposed coaxially in the main bore.

For installation, with the seal rings R in place, the unit is secured by appropriate bolts through apertures 19 to a face flange or input flange DPI of a differential pressure instrument, and the tubing connections T established from the fittings to the respective process line pressure taps. For diverse spacings of a pair of pressure communicating passages in a valve-mounting flange of an instrument device, some accommodation is offered by the large areas encompassed by the rings R.

The valve obviously is set by turning the handle to legend-reference setting points, thus at one extreme for instrument operating condition ("process mode") to align the diametric passages of both ball members with the passages 14, 15, so that by each ball the valve inlet port and passage and associated outlet port and passage are put in communication; at the other extreme setting ("calibration mode") to set the instrument completely out of operating condition by bringing the major spherical surface portions lying between the main ball passages and the slots against and covering the seal rings 10 for both the inlet and outlet ports within the valve, thereby to isolate the ports from each other and from the main bore. Finally handle setting at an intermediate position brings the valve into a zero test position ("zero mode") with the slots 21a and 22s overlapping the outlet ports, and slots 22x overlapping the seat seal of the high pressure inlet port, applying process line high pressure to the main bore space between the valve members and thereby, through the slots 21s, 22s, applying that same high pressure to both the outlet ports, hence to the inlets of the pressure differential pressure instrument, as an applied zero differential pressure for zero checking.

Further the last named position may be used, when a more extensive calibration has been carried out in the instrument, for example, with air where the process line is water, to purge air from the system (passage vents in the instrument being opened for this purpose) by applying process line liquid to it through the valve, purging air from the valve, teh valve outlet passages, and the inlet port passages of the instrument.

Thus after a calibration of the associated instrument, in the return to process mode setting, it is necessary for the valve to pass through the zero mode setting, and thus equalize pressures in the two sides of the instrument before the instrument is back in service, so that it is impossible to damage the instrument by "bumping," driving any associated recording device off scale or destroying the calibration.

The simplicity of the structure for low cost fabrication and maintenance is apparent.

Notably also, the transit of the zero mode position, by the valve member going from calibration setting to put the instrument back on the process line, pressurizes the bore space substantially to process line pressure. This pressurization, well maintained by the stem seal, results in subjecting the seat assemblies not to the pressure difference of the respective tap pressure and atmospheric pressure, but rather to the differential prevailing between the pressures in the two pressure taps, e.g., the drop across an orifice plate, and advantageously diminishes seat leakage.

What is claimed is:

1. An instrumentation manifold valve for connecting two pressure tap points to two respective pressure input inlets of a differential pressure instrument device, comprising
   a manifold body block having a central main bore,
      a first pressure inlet port and associated first pressure outlet port opening into said bore at locations angularly spaced about the bore, a second pressure inlet port and associated second pressure outlet port opening into said bore at locations angularly spaced about the bore and axially spaced from the first said locations,
      the said pressure inlet ports and pressure outlet ports being in communication with respective external connection formations on the block whereby the valve inlet ports are connectable to said pressure tap points and the outlet ports connectable to said differential pressure instrument device;
   two spherical valving members rotationally sealing respectively to the associated first ports and associated second ports for controlling flow through the ports,
      said members being smaller in diameter than said main bore; a valve stem structure in coaxially spaced relation to the main bore wall and rigidly secured to said valve members and fixedly securing them to each other in axial alignment and in axially spaced relation,
   said stem structure having
      at least one stem end projecting from and rotationally sealed to one end of the bore,
      the other end of the bore being closed;
   the axial spacing of the members and coaxial spacing of the stem structure leaving free bore space about the stem and between said members;
      said valving members having therethrough respective first passages for putting the first ports in communication with each other and the second ports in communication with each other at a first rotational stem setting;
      said valving members having therein respective second passages angularly offset, about the axis of rotation, from said first passages, and in constant communication with said free space and thereby with each other for putting the valve outlet ports and thereby the differential pressure device input inlets in communication with each other at one rotational setting of the stem for device balancing or zero checking;
   and
   a valve operating element on the projecting stem end.

2. A valve as described in claim 1, wherein
   the angular offset between said first and second passages in the valving members affords a further rotational setting
      where the said inlet and outlet ports are closed to each other and to the free bore space whereby all connection formations and thereby the pressure taps and input inlets are severally isolated from each other.

3. A valve as described in claim 1, wherein
   one of said valving members has therein a third passage in constant communication with said free bore space
      for setting a respective one of the said inlet ports into communication with the bore space and hence also said outlet ports at said other stem setting.

4. A valve as described in claim 3, wherein
   the angular offset between said first and second passages in the valving members affords a further rotational setting
      where the said inlet and outlet ports are closed to each other and to the free bores space whereby all connection formations and thereby the pressure taps and input inlets are severally isolated from each other;
   said operating element comprising a handle for manual operation; and
   there is provided rotational stop means for said handle establishing said first setting and further setting at extreme rotational positions, as first and third settings in a setting sequence with said other setting a second setting therebetween;
   whereby any residual pressure differentials in an instrument are reduced or eliminated as the valve is changed from said third setting to said first setting, thereby to eliminate danger to the instrument by bumping as it is restored to service.

5. A valve as described in claim 1, wherein
   said manifold block has the ports in each associated pair diametrically aligned with each other across the bore;
   said valving members comprise respective balls incorporated in the structure of said stem and having a diameter slightly smaller than said bore, each ball having diametric rotationally sealed engagement with the bore mouths of the respective pair of associated ports, each ball having a diametric flow passage perpendicular to the stem axis as a respective said first passage;

each ball having a respective slot extending parallel with the stem axis as the respective said second passage; and said main bore having its said one end closed by a threaded-in sealed plug having an axial bore with said stem projecting therethrough and rotationally sealed thereto, whereby the stem and ball structure is insertable from said one end before closure by the plug;

said ports being provided with respective tough elastomeric seat seal rings projecting slightly into said bore to form port mouths with the balls sealingly seated therebetween to afford said diametric engagement.

6. A valve as described in claim 5, wherein
the angular offset between said diametric flow passage and said slot in each ball affords a further rotational setting
where the said inlet and outlet ports are closed to each other and to the free bore space whereby all connection formation sand thereby pressure taps and input inlets are severally isolated from each other.

7. A valve as described in claim 6, wherein
one of said balls has therein as a third passage a second slot diametrically opposed to the first slot therein and in constant communication with said free bore space
for setting one of said inlet ports into communication with the bore space and hence also with said outlet ports at said other stem setting.

8. A valve as described in claim 7, wherein
said block is elongated with an oblong transverse section with a pair of opposed faces bounding a narrow transverse dimension;
the associated aligned pairs of ports are provided by a respective transverse passage extending through the block
perpendicular to said opposed faces and to the main bore axis;
said transverse passages each including a respective counterbore
running in, from a common one said opposed face, diametrically across the main bore and forming a shoulder between the main bore and the other said opposed face supporting a respective one of said seat seal rings on one side of a respective ball;
each said counterbore supporting a second one of said seat seal rings on the other side of the respective ball retained by means threaded into the outer end of the counterbore.

9. A valve as described in claim 8, wherein the said means threaded into each said counterbore is a tubing connector fitting and constitutes a said external connection formation at said one opposed face.

10. A valve as described in claim 8, wherein
said block has a plurality of through bolt apertures perpendicular to the said opposed faces; and
the external connection formations at the other opposed face each comprises the opening of a respective transverse passage through that face, and
a sealing ring received in a face groove concentric with that opening;

whereby said valve may be flange-mounted and sealed to a device having a flange with a pair of pressure inlet or outlet openings spaced to fall within the respective sealing ring circumferences.

11. A valve as described in claim 8, wherein
each said counterbore constitutes a said external connection formation at said one opposed face and the said means threaded therein being a tubing connector fitting;
said block has a plurality of through bolt apertures perpendicular to the said opposed faces; and
the external connection formations at the other opposed face each comprises
the opening of a respective transverse passage through that face, and
a sealing ring received in a face groove concentric with that opening;
whereby said valve may be flanged-mounted and sealed to a device having a flange with a pair of pressure inlet or outlet openings spaced to fall within the respective sealing ring circumferences.

12. A valve as described in claim 11, wherein
said operating element comprises a handle for manual operations;
there is provided rotational stop means for said handle establishing said first setting and further setting at extreme rotational positions, as first and third settings in a setting sequence with said other setting a second setting therebetween;
said stem being securable in said knob at each of two positions 180° from each other
whereby the valve optionally may be used with the said connector fittings as on the valve inlet or outlet sides, merely by change of the stem and knob relative positions.

13. A valve as described in claim 1, wherein
said manifold block has the ports in each associated pair diametrically aligned with each other across the bore;
said valving members comprise respective balls incorporated in the structure of said stem and having a diameter slightly smaller than said bore,
each ball having diametric engagement in the bore mouths of the respective pair of associated ports,
each ball having a diametric flow passage perpendicular to the stem axis as a respective said first passage;
each ball having a respective slot extending parallel with the stem axis as the respective said second passage; and
said main bore having its said one end closed by a threaded-in plug, sealed rotationally with said stem projecting through an axial bore therethrough, and sealed to said main bore,
whereby the stem and ball structure is insertable from said one end before closure by the plug;
said ports being provided with respective tough elastomeric seat seal rings projecting slightly into said bore to form said port mouths with the balls rotatably sealingly seated therebetween to afford said diametric engagements;

each said seal ring being supported in a coaxially recessed headed end of a tubular carrier element and sealing to surfaces of the head recess, said head received in the respective said port and sealed within the port by a second elastomeric seal ring on a carrier tubular body portion extending further into the port beyond a shoulder within the port and with endwise and circumferential clearance;

said second seal ring effecting a seal between the carrier and said shoulder.

14. A valve as described in claim 13, wherein said block is elongated with a pair of opposed faces bounding a narrow transverse dimension;

the associated aligned pairs of ports are provided by a respective transverse passage extending through the block perpendicular to said opposed faces and to the main bore axis; said transverse passages each including a respective counterbore running in, from a common one said opposed face, diametrically across the main bore and forming a said shoulder between the main bore and the other said opposed face supporting on one side of a respective ball a respective said second seal ring and therewith the associated carrier and seat seal ring as a seat assembly;

each said counterbore, and connector means threaded into the outer end of the counterbore to provide a shoulder, supporting on the other side of the respective ball a second said seat assembly;

whereby said seat assemblies may be inserted in the body through said counterbore as successive pairs alternately with emplacement of the stem and ball structure.

* * * * *